APPARATUS FOR DIP-COATING
Anthony Bradley, Harry Hyman Topper, and Gerald Yeats, Runcorn, England, assignors to Imperial Chemical Industries Limited, London, England, a corporation of Great Britain
Filed Apr. 15, 1964, Ser. No. 359,853
Claims priority, application Great Britain, Apr. 22, 1963, 15,838/63
2 Claims. (Cl. 118—429)

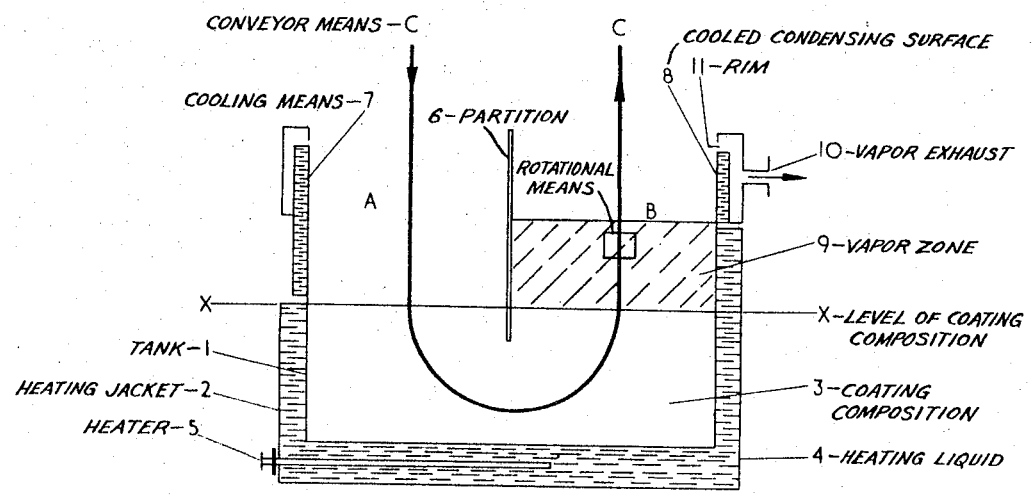

The present invention relates to an apparatus suitable for the dip-coating of articles with a lacquer or paint. More particularly it relates to an apparatus that is specially useful for the coating of polyolefinic articles and to an improved process for coating said articles.

It is known to coat the surface of massive articles or films of polyolefinic material, such as homopolymers and copolymers of propylene and ethylene, with a thin layer of a lacquer or paint, usually for the purpose of decoration or to enable printing to be carried out or the vacuum deposition of a metal coating such as aluminium on the surface. Polyolefines as moulded or extruded do not, however, bond strongly with coating materials since their surfaces do not have a good affinity for other resins. It has been proposed to overcome the difficulty by etching the surface of the polyolefine with a strong acid such as chromic acid before applying the coating, but such acid treatments are objectionable because of handling problems. More recently it has been proposed to prepare the polyolefine surface for coating by treating it with hot hydrocarbon or chlorinated hydrocarbon solvents or their vapours to etch or swell the surface, after which a resin coating in a suitable vehicle may be applied by dipping, spraying or other conventional lacquering and painting techniques. It is also known to combine the etching and coating steps by using as the vehicle for the coating resin a solvent such as trichloroethylene which swells the polyolefine surface. Thus by dipping the polyolefine article in the hot coating resin solution both etching and coating take place.

We have now found that the process of coating polyolefinic homopolymer and copolymer articles by dipping in a hot solution of a coating composition in trichloroethylene or perchloroethylene can be improved by submitting the coated articles immediately after dipping to a short immersion in the vapour of the same solvent trichloroethylene or perchloroethylene before the coating is allowed to dry, and we now provide an apparatus suitable for carrying out this improved process.

According to the invention there is provided an apparatus for coating polyolefinic homopolymer and copolymer articles with a lacquer or paint which comprises a tank adapted to contain in a lower portion thereof a body of a volatile liquid, a vertical partition dipping below the liquid level and dividing a portion of the tank which is above the liquid level into two upper compartments, means for heating said liquid, means for condensing vapour from said liquid in one upper compartment adapted to prevent the accumulation of vapour in said compartment, means for condensing vapour in the other upper compartment spaced away from the liquid surface so as to allow the establishment of a zone of concentrated vapour from said liquid between the liquid level and the condensing means in said other upper compartment, means for heating said zone of concentrated vapour, and means for conveying articles downwards into the tank through the vapour-free space on one side of the partition, into the liquid, across the tank, up through the heated zone of concentrated vapour on the opposite side of the partition and out of the tank.

For coating polyolefinic articles, a body of liquid comprising a coating composition dissolved in trichloroethylene or perchloroethylene is maintained at or near its boiling point in the lower portion of the said apparatus. Because of the vapour condensing means provided in the upper compartment through which the articles enter the apparatus, articles conveyed through the apparatus pass into the liquid without coming into contact with any significant amount of solvent vapour. We have found that this arrangement is often advantageous because the surface properties of polyolefines can vary according to the method of production and although etching in solvent vapour before coating is useful with some types of articles we have found that it is best to avoid vapour etching and to rely on etching in the liquid during coating when treating other types of articles.

Because of the spacing of the vapour condensing means away from the liquid level in the upper compartment of the apparatus through which the treated articles leave the apparatus a zone containing solvent vapour is established above the liquid in this compartment, through which the articles pass immediately after emerging from the coating liquid, and the heating means provided for this zone maintains the vapour in concentrated state.

Within the scope of the invention there is therefore also provided a process for coating polyolefinic homopolymer and copolymer articles with a lacquer or paint which comprises passing the said articles downwardly from the atmosphere into a solution of a coating composition in trichloroethylene or perchloroethylene held at or near its boiling point and withdrawing the said articles from the solution through a heated zone of concentrated vapour of the same solvent trichloroethylene or perchloroethylene into the atmosphere.

We have found that the upward passage of the articles through the vapour zone on their way out of the plant provides a useful levelling action on the coating received in the liquid. This vapour zone is also useful in assisting draining of articles having recesses or blind holes that tend to trap an excess of coating solution. It can be arranged for example that such articles are rotated about a horizontal axis to drain them on their way out of the plant while passing through the vapour zone. Because of the presence of the vapour, drying out of the coating cannot occur in this zone and thorough drainage can be achieved with resultant even thickness of coating. Provided that the articles have remained in the liquid long enough to attain substantially the temperature of the hot solution, little or no condensation of vapour takes place on their surface in the vapour zone so that no significant amount of the coating is washed off the articles as they pass through this zone and only the beneficial draining and levelling effects on the coating occur. Nevertheless, in order to guard against accidental removal of some of the coating, the time of passage of the articles through the vapour zone should not be unnecessarily prolonged. For example a residence time of 60 seconds in the vapour zone should not normally be exceeded and a time of 30 seconds or less is usually sufficient for draining and levelling the coating.

For coating compositions to be suitable for application to polyolefinic surfaces by the process of the invention the resins employed in the compositions must be soluble in trichloroehtylene or perchloroethylene. These include notably chlorinated polymers and alkyd/urea resins. Chlorinated polymeric materials are particularly suitable, for instance chlorinated rubber, chlorinated polyisoprene and the soluble varieties of chlorinated polypropylene, chlorinated polyethylene and chlorinated polyvinyl chloride. Other resins that are soluble in the chlorinated hydrocarbon solvent employed, for instance acrylic resins, may be mixed with these chlorinated polymers, and the compositions will usually include plasticisers or extenders such as the chlorinated paraffinic oils and waxes and the chlorinated diphenyls. Such mixtures may be employed as clear lacquers or they may contain opacifiers, pigments, dyestuffs and metallising powders dissolved or dispersed therein so as to produce coloured lacquers or paints.

One suitable method of maintaining the coating liquid at the required temperature is to provide a heating jacket encompassing the walls of the tank up to the liquid level, and preferably also covering the base of the tank. The jacket may be extended upwards around the outer walls of the upper compartment which contains the vapour zone so as to heat this zone as well, or a separate heating jacket may be fitted around the vapour zone if desired. When the solvent for the coating composition is trichloroethylene the jacket may be supplied with hot water and the necessary water temperature may suitably be maintained by means of an electric heater immersed in the water jacket. When the solvent is perchlorethylene the jacket may suitably be heated by a supply of steam or high-pressure hot water. Other controllable heating means are, however, permissible.

One embodiment of an apparatus according to the invention, adapted for use with a coating composition where the solvent vehicle is trichloroethylene, is shown in the drawing accompanying the Provisional Specification. A tank 1, fitted with a jacket 2, contains in its lower portion a body of liquid 3 comprising a coating composition dissolved in trichloroethylene. A vertical partition 6 dipping below the surface of the coating liquid divides the upper portion of the tank into two compartments A and B. Jacket 2 terminates below compartment A at the level of the coating liquid X—X but extends upwards around the outer walls of compartment B to the level Y. The temperature of the liquid 3 can be maintained at or near its boiling point by means of hot water 4, which fills the jacket and thereby also heats vapour zone 9 of compartment B. The hot water is maintained at the required temperature by electric heater 5. Compartment A is provided with a water-cooled condensing surface 7 having its lower limit close to the surface of the liquid 3 so as to condense trichloroethylene vapour arising from the hot liquid and allow the condensed solvent to return to the body of liquid 3, thereby preventing the build-up of vapour in this compartment. Compartment B is provided with a water-cooled condensing surface 8, spaced away from the surface of the liquid 3 so that it prevents the escape of vapour from the top of compartment B but allows the establishment of vapour zone 9 containing a high concentration of trichloroethylene vapour above the surface of liquid 3. As an extra safeguard against escape of vapour from the apparatus the pipe 10 may be connected to an extractor fan so that air is drawn in at the rim of the tank as shown at 11. This air, together with any trichloroethylene vapour entrained therein, can be led away via pipe 10 and the fan (not shown) to an effluent or recovery system. A conveyor (not shown in detail) is arranged to carry polyolefine articles through the apparatus along path C in the direction indicated by the arrows. The articles to be coated are carried down into the apparatus by means of the conveyor, directly into the coating liquid 3 without coming into contact with any significant concentration of trichloroethylene vapour, they receive a surface etch and coating in liquid 3 and receive an after-treatment in trichloroethylene vapour as they pass upwards through vapour zone 9 on their way out of the apparatus. The relative times of treatment in the coating liquid and after-treatment in the solvent vapour can be varied by suitable arrangement of the depths of coating liquid 3 and vapour zone 9, the latter being governed by the spacing of condensing surface 8 in relation to the surface of the liquid 3.

For best results we have found that the solution of coating composition should be maintained at a temperature slightly below its boiling point so that a good supply of solvent vapour is evolved into the heated vapour zone but the solution is not physically boiling, i.e., vapour bubbles are not formed in the liquid. For instance, when using a solution of a coating resin in trichloroethylene in an apparatus of the type shown in the drawing, the temperature of the water jacket surrounding the liquor and vapour zones in most suitably 75–85° C., thus providing a temperature of about 70–75° C. in the liquor.

What we claim is:

1. An apparatus for coating polyolefinic homopolymer and copolymer articles with a lacquer or paint which comprises a tank adapted to contain in a lower portion thereof a body of a volatile liquid, a vertical partition dipping below the liquid level and dividing a portion of the tank which is above the liquid level into two upper compartments, means for heating said liquid, means for condensing vapour from said liquid in one upper compartment adapted to prevent the accumulation of vapour in said compartment, means for condensing vapour in the other upper compartment spaced away from the liquid level so as to allow the establishment of a zone of concentrated vapour from said liquid between the liquid level and the condensing means in said other upper compartment, means for heating said zone of concentrated vapour, and means for conveying articles downwards into the tank through the vapour-free space on one side of the partition, into the liquid, across the tank, up through the heated zone of concentrated vapour on the opposite side of the partition and out of the tank.

2. An apparatus according to claim 1 wherein there is provided a means for rotating the articles about their horizontal axis while being withdrawn through the heated vapor zone into the atmosphere.

References Cited

UNITED STATES PATENTS

| | | | |
|---|---|---|---|
| 2,501,672 | 3/1950 | Gerin | 117—113 |
| 2,515,489 | 7/1950 | Borushko | 117—113 |
| 2,662,033 | 12/1953 | Andrew | 117—47 |
| 2,701,544 | 2/1955 | Lantz | 117—113 |
| 2,728,686 | 12/1955 | Borushko | 117—113 |
| 2,755,507 | 7/1956 | Heller | 117—113 |
| 2,808,340 | 10/1957 | Learn | 117—47 |
| 2,812,269 | 11/1957 | Ransburg | 117—113 |
| 2,861,897 | 11/1958 | Hendrixson | 117—113 |
| 2,873,241 | 2/1959 | Strzyzewski et al. | 117—47 |
| 2,930,349 | 3/1960 | Jones | 118—602 |

MURRAY KATZ, *Primary Examiner.*